US007328448B2

(12) United States Patent
Eldering et al.

(10) Patent No.: US 7,328,448 B2
(45) Date of Patent: Feb. 5, 2008

(54) ADVERTISEMENT DISTRIBUTION SYSTEM FOR DISTRIBUTING TARGETED ADVERTISEMENTS IN TELEVISION SYSTEMS

(75) Inventors: Charles A. Eldering, Doylestown, PA (US); Komlika K. Gill, Cherry Hill, NJ (US)

(73) Assignee: Prime Research Alliance E, Inc. (VG)

( * ) Notice: Subject to any disclaimer, the term of this patent is extended or adjusted under 35 U.S.C. 154(b) by 840 days.

(21) Appl. No.: 09/748,942

(22) Filed: Dec. 27, 2000

(65) Prior Publication Data

US 2002/0083443 A1    Jun. 27, 2002

Related U.S. Application Data

(60) Provisional application No. 60/229,156, filed on Aug. 31, 2000.

(51) Int. Cl.
*H04N 7/10* (2006.01)
*H04N 7/173* (2006.01)

(52) U.S. Cl. .................. 725/32; 725/42; 725/115; 725/116

(58) Field of Classification Search .............. 725/34, 725/35, 42, 32, 115, 116; 705/10, 14
See application file for complete search history.

(56) References Cited

U.S. PATENT DOCUMENTS

| | | |
|---|---|---|
| 4,602,279 A | 7/1986 | Freeman |
| 4,930,011 A | 5/1990 | Kiewit |
| 5,029,014 A | 7/1991 | Lindstrom |
| 5,099,319 A | 3/1992 | Esch et al. ............ 358/86 |
| 5,155,591 A | 10/1992 | Wachob ............ 358/86 |
| 5,231,494 A | 7/1993 | Wachob |
| 5,271,626 A | 12/1993 | Llenas et al. |
| 5,319,455 A | 6/1994 | Hoarty et al. |

(Continued)

FOREIGN PATENT DOCUMENTS

CA            2264392         1/1999

(Continued)

OTHER PUBLICATIONS

NCTA Technical Papers "Compressed Digital Commercial Insertion: New Technology Architectures for the Cable Advertising Business" 1992 8 pages.

(Continued)

*Primary Examiner*—Kieu-Oanh Bui
(74) *Attorney, Agent, or Firm*—Technology, Patents & Licensing, Inc.

(57) ABSTRACT

Providing refreshed advertisements to subscriber equipment 210, such as a set-top box. A "client" application runs on the subscriber equipment 210 and includes a queue 404 for storing targeted advertisements, a processor 402 for monitoring the display of each advertisement to the subscriber, a counter 410 for counting each display, and a trigger circuit 406 for initiating an advertisement download each time it is determined that the queue of advertisements stored at the client application has reached a low-level threshold. An advertisement management system 202 provides advertisements to the client application. These advertisements may be network-based advertisements or may be targeted to each individual subscriber, based on a subscriber profile that is provided by a subscriber characterization system 204.

39 Claims, 11 Drawing Sheets

U.S. PATENT DOCUMENTS

| | | | |
|---|---|---|---|
| 5,410,344 A | 4/1995 | Graves | |
| 5,424,770 A | 6/1995 | Schmelzer et al. | |
| 5,425,100 A | 6/1995 | Thomas et al. | |
| 5,446,919 A | 8/1995 | Wilkins | |
| 5,534,911 A | 7/1996 | Levitan | |
| 5,559,549 A | 9/1996 | Hendricks | |
| 5,579,055 A | 11/1996 | Hamilton | |
| 5,585,858 A | 12/1996 | Harper | |
| 5,600,364 A | 2/1997 | Hendricks et al. | 348/1 |
| 5,600,366 A | 2/1997 | Schulman | |
| 5,600,573 A | 2/1997 | Hendricks et al. | |
| 5,604,542 A | 2/1997 | Dedrick | |
| 5,612,742 A | 3/1997 | Krause | |
| 5,621,728 A | 4/1997 | Lightfoot | |
| 5,636,346 A | 6/1997 | Saxe | |
| 5,650,994 A | 7/1997 | Daley | |
| 5,652,615 A | 7/1997 | Bryant et al. | |
| 5,661,516 A | 8/1997 | Carles | 348/8 |
| 5,724,091 A | 3/1998 | Freeman | |
| 5,724,521 A | 3/1998 | Dedrick | |
| 5,740,549 A | 4/1998 | Reilly et al. | 705/14 |
| 5,752,160 A | 5/1998 | Dunn | |
| 5,752,238 A | 5/1998 | Dedrick | |
| 5,758,257 A | 5/1998 | Herz et al. | |
| 5,758,328 A | 5/1998 | Giovannoli | |
| 5,761,601 A | 6/1998 | Nemirofsky et al. | 455/3.1 |
| 5,774,170 A | 6/1998 | Hite et al. | 348/9 |
| 5,781,226 A | 7/1998 | Sheehan | 348/6 |
| 5,790,426 A | 8/1998 | Robinson | |
| 5,790,935 A | 8/1998 | Payton | |
| 5,801,747 A | 9/1998 | Bedard | |
| 5,801,753 A | 9/1998 | Eyer et al. | |
| 5,805,974 A | 9/1998 | Hite | |
| 5,808,694 A | 9/1998 | Usui | |
| 5,815,671 A | 9/1998 | Morrison | |
| 5,848,352 A | 12/1998 | Dougherty et al. | |
| 5,848,397 A * | 12/1998 | Marsh et al. | 705/14 |
| 5,861,919 A | 1/1999 | Perkins et al. | |
| 5,886,731 A | 3/1999 | Ebisawa | |
| 5,917,830 A | 6/1999 | Chen et al. | |
| 5,918,014 A | 6/1999 | Robinson | |
| 5,926,205 A | 7/1999 | Krause et al. | |
| 5,931,901 A | 8/1999 | Wolfe et al. | 709/206 |
| 5,948,061 A | 9/1999 | Merriman | |
| 5,966,120 A | 10/1999 | Arazi | |
| 5,969,715 A | 10/1999 | Dougherty et al. | |
| 5,978,381 A | 11/1999 | Perlman | |
| 5,990,927 A | 11/1999 | Hendricks | |
| 6,002,393 A * | 12/1999 | Hite et al. | 715/719 |
| 6,002,394 A | 12/1999 | Schein | |
| 6,005,534 A * | 12/1999 | Hylin et al. | 345/2.1 |
| 6,009,409 A | 12/1999 | Adler | |
| 6,009,410 A | 12/1999 | LeMole | |
| 6,020,880 A | 2/2000 | Naimpally | |
| 6,020,883 A | 2/2000 | Herz | |
| 6,026,368 A | 2/2000 | Brown et al. | 705/14 |
| 6,026,369 A | 2/2000 | Capek | 705/14 |
| 6,029,045 A | 2/2000 | Picco et al. | 455/5.1 |
| 6,038,256 A | 3/2000 | Linzer | |
| 6,055,510 A | 4/2000 | Henrick | |
| 6,061,097 A | 5/2000 | Satterfield | |
| 6,088,722 A | 7/2000 | Herz | |
| 6,119,098 A | 9/2000 | Guyot et al. | 705/14 |
| 6,141,010 A | 10/2000 | Hoyle | |
| 6,144,653 A | 11/2000 | Persson et al. | |
| 6,160,570 A | 12/2000 | Sitnik | |
| 6,160,989 A | 12/2000 | Hendricks et al. | |
| 6,177,931 B1 | 1/2001 | Alexander et al. | |
| 6,181,334 B1 | 1/2001 | Bhagavath et al. | |
| 6,252,634 B1 | 6/2001 | Yuen et al. | |
| 6,253,238 B1 | 6/2001 | Lauder | |
| 6,263,501 B1 | 7/2001 | Schein | |
| 6,357,042 B2 | 3/2002 | Srinivasan et al. | |
| 6,378,130 B1 | 4/2002 | Adams | |
| 6,418,122 B1 | 7/2002 | Schoenblum | |
| 6,425,131 B2 | 7/2002 | Crandall et al. | |
| 6,434,747 B1 * | 8/2002 | Khoo et al. | 725/34 |
| 6,446,082 B1 | 9/2002 | Arita | |
| 6,446,261 B1 | 9/2002 | Rosser | |
| 6,459,427 B1 | 10/2002 | Mao et al. | |
| 6,463,585 B1 | 10/2002 | Hendricks | |
| 6,487,721 B1 | 11/2002 | Safadi | |
| 6,493,875 B1 | 12/2002 | Eames | |
| 6,505,169 B1 | 1/2003 | Bhagavath et al. | |
| 6,507,949 B1 * | 1/2003 | Jonason et al. | 725/22 |
| 6,516,002 B1 | 2/2003 | Huang | |
| 6,583,825 B1 | 6/2003 | Yuen et al. | |
| 6,615,039 B1 | 9/2003 | Eldering | |
| 6,631,523 B1 | 10/2003 | Matthews, III | |
| 6,675,385 B1 | 1/2004 | Wang | |
| 6,684,194 B1 | 1/2004 | Eldering et al. | |
| 6,698,020 B1 * | 2/2004 | Zigmond et al. | 725/34 |
| 6,704,930 B1 | 3/2004 | Eldering et al. | |
| 6,718,551 B1 * | 4/2004 | Swix et al. | 725/32 |
| 6,724,974 B2 | 4/2004 | Naruto | |
| 6,738,978 B1 | 5/2004 | Hendricks | |
| 6,796,555 B1 | 9/2004 | Blahut | |
| 6,820,277 B1 | 11/2004 | Eldering | |
| 2001/0013124 A1 | 8/2001 | Klosterman | |
| 2001/0032333 A1 | 10/2001 | Flickinger | |
| 2002/0026645 A1 | 2/2002 | Son | |
| 2002/0038455 A1 | 3/2002 | Srinivasan | |
| 2002/0087976 A1 | 7/2002 | Kaplan | |
| 2002/0104083 A1 | 8/2002 | Hendricks | |
| 2002/0129374 A1 | 9/2002 | Freeman | |
| 2002/0152471 A1 | 10/2002 | De Haas | |
| 2003/0088872 A1 | 5/2003 | Maissel et al. | |
| 2003/0200128 A1 | 10/2003 | Doherty | |

FOREIGN PATENT DOCUMENTS

| | | |
|---|---|---|
| WO | WO 9717774 | 5/1997 |
| WO | 0054504 | 3/1999 |
| WO | WO9926415 | 5/1999 |
| WO | 9952285 | 10/1999 |
| WO | 0147279 | 12/1999 |
| WO | 9966719 | 12/1999 |
| WO | WO 9960789 | 12/1999 |
| WO | WO 9965237 | 12/1999 |
| WO | 0233973 | 10/2000 |
| WO | 0233975 | 10/2000 |
| WO | WO0069163 | 11/2000 |
| WO | WO 0049801 | 10/2001 |

OTHER PUBLICATIONS

AdLink Engineering, Ad insertion wiring diagrams, 1999, 17 pages.
U.S. Appl. No. 09/204,888, Charles A. Eldering.
U.S. Appl. No. 09/635,539, Charles A. Eldering.
U.S. Appl. No. 09/635,542, Charles A. Eldering.
U.S. Appl. No. 09/712,790, Charles A. Eldering.
U.S. Appl. No. 09/742,852, Charles A. Eldering.
U.S. Appl. No. 09/742,534, Charles A. Eldering.
U.S. Appl. No. 09/750,800, John A. Schlack.

* cited by examiner

| $Q_1$ | $ARL_1$ |
|---|---|
| $Q_2$ | . . |
| $Q_3$ | $ARL_n$ |
| $Q_4$ | $ARL_1$ |
| . . . . | . . . . |
| $Q_m$ | $ARL_n$ |

*FIG. 1*

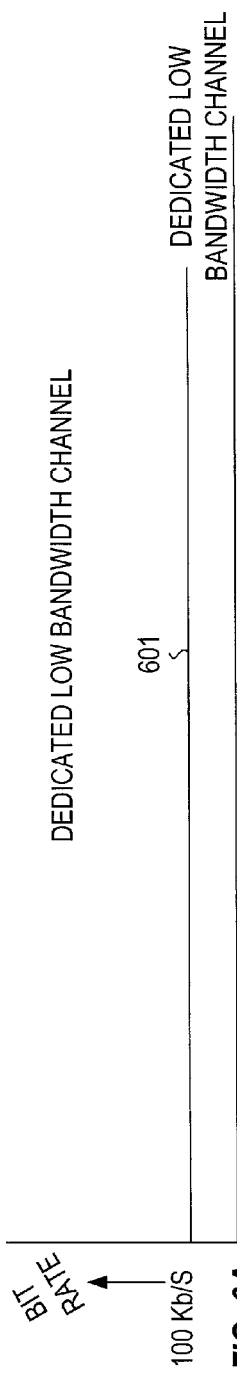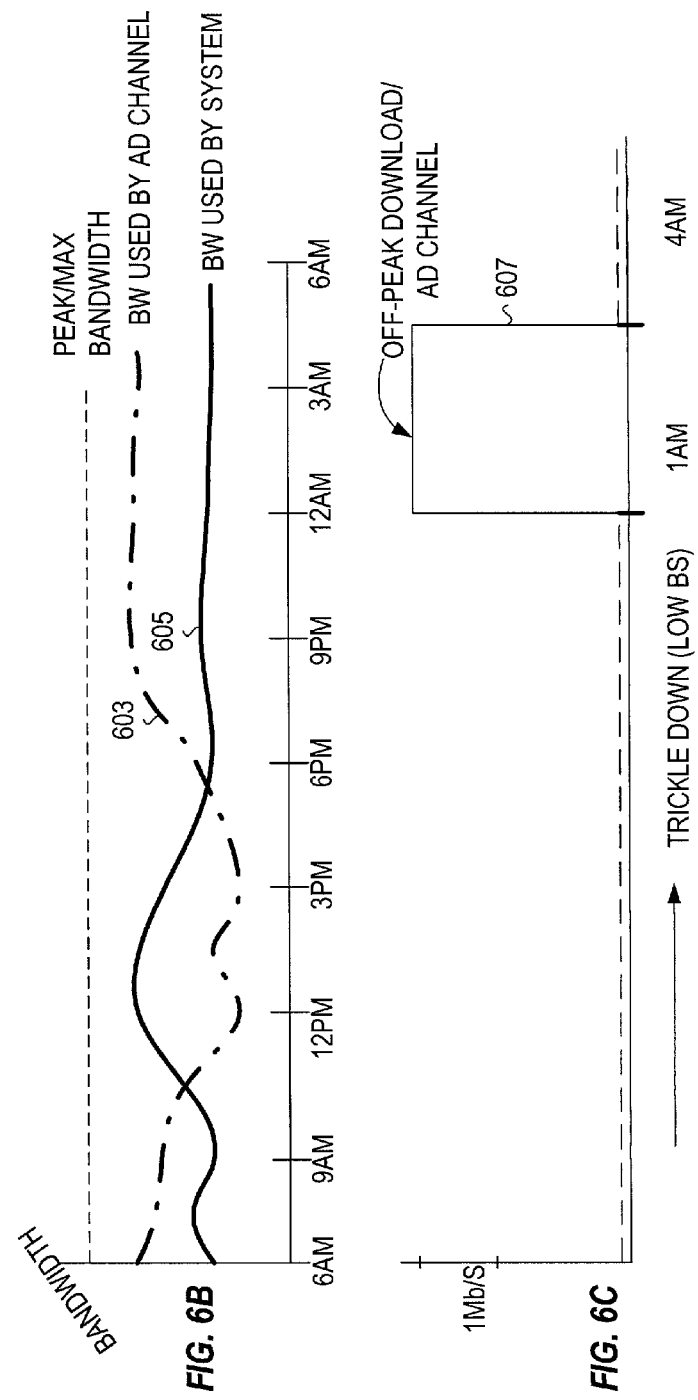
FIG. 6A
FIG. 6B
FIG. 6C

| | |
|---|---|
| $Q_1$ | $ARL_1$ (FORD) |
| $Q_2$ | $ARL_2$ |
| $Q_3$ | $ARL_3$ |
| $Q_4$ | $ARL_4$ |
| $Q_5$ | $ARL_5$ |
| $Q_6$ | $ARL_1$ (FORD) |
| $Q_7$ | $ARL_6$ |
| $Q_8$ | $ARL_7$ |
| $Q_9$ | $ARL_8$ |
| $Q_{10}$ | $ARL_9$ |
| $Q_{11}$ | $ARL_1$ (FORD) |

*FIG. 7*

| $Q_1$ | $ARL_1$ ($FORD_1$) |
|---|---|
| $Q_2$ | $ARL_2$ |
| $Q_3$ | $ARL_3$ |
| $Q_4$ | $ARL_4$ |
| $Q_5$ | $ARL_5$ |
| $Q_6$ | $ARL_6$ ($FORD_2$) |
| $Q_7$ | $ARL_7$ |
| $Q_8$ | $ARL_8$ |
| $Q_9$ | $ARL_9$ |
| $Q_{10}$ | $ARL_{10}$ |
| $Q_{11}$ | $ARL_{11}$ ($FORD_3$) |

*FIG. 8*

| | |
|---|---|
| $Q_1$ | $ARL_1$ (FORD) |
| $Q_2$ | $ARL_2$ |
| $Q_3$ | $ARL_3$ |
| $Q_4$ | $ARL_4$ |
| $Q_5$ | $ARL_5$ |
| $Q_6$ | $ARL_6$ |
| $Q_7$ | $ARL_7$ |
| $Q_8$ | $ARL_1$ (FORD) |
| $Q_9$ | $ARL_8$ |
| $Q_{10}$ | $ARL_9$ |
| $Q_{11}$ | $ARL_{10}$ |
| $Q_{12}$ | $ARL_{11}$ |
| $Q_{13}$ | $ARL_{12}$ |
| $Q_{14}$ | $ARL_1$ (FORD) |
| $Q_{15}$ | $ARL_{13}$ |

*FIG. 9*

ADVERTISEMENT DISTRIBUTION SYSTEM FOR DISTRIBUTING TARGETED ADVERTISEMENTS IN TELEVISION SYSTEMS

This patent application claims benefit under 35 USC §1.19(e) of Provisional application No. 60/229,156 filed on Aug. 31, 2000 entitled Method and System for Addressable and Program Independent Advertising, which is incorporated herein by reference.

BACKGROUND OF THE INVENTION

Traditional broadcast television is a single orientation point to a plurality of destination points system in which the same television signal is broadcast to each person viewing a particular station. Thus, each person viewing a particular channel will necessarily view the same programming content as well as the same advertisements embedded in the programming content. For most broadcast medium industries, such as television, advertising revenues may be the sole source of revenues for the television broadcaster. In a conventional television broadcast system, many advertisers compete for the opportunity to place their advertisement in the advertisement breaks between the programming content. In addition, once a particular advertising break has been filled with an advertisement, the television broadcaster can no longer sell that space in the broadcast stream. Because the advertisements on a particular channel are seen by every viewer tuned to the particular channel in a conventional television system, the advertisements in a conventional television broadcast system cannot be targeted to a particular portion of the audience or even to a particular individual. Therefore, the television broadcast operator may only derive a limited predetermined amount of advertising revenue from any particular advertisement spot. It is desirable to provide the broadcaster with a system for increasing the advertisement revenues that may be generated.

The problem with advertisements on a conventional television broadcasting system for the advertiser is that each advertiser is interested in reaching only one or more subsets of the total viewing audience because not all members of the viewing audience may be desirable candidates for receiving a particular advertisement. For example, an advertisement about a product for male hair growth would typically be directed to males because males are more likely to purchase the product. The proportion of the audience which is thought to be genuinely interested in the advertisement (or believed by the advertiser to be a prime candidate to purchase their product) varies by product category, but normally ranges from 20-40%. Therefore, the advertisement viewed by the other 60-80% of the audience, which are not prime candidates, represents a large amount of wasted spending by the advertiser. Therefore, it is desirable to provide a system which permits an advertiser to more carefully direct advertisements to a particular set of people or even to an individual person so that the advertiser does not waste large sums of money on parts of the audience which do not have any interest in their product. Thus, both television broadcasters and advertisers desire a better way in which to provide advertisements to the audience in a more targeted manner.

The emerging digital television media, in various forms such as digital cable, direct broadcast satellite and wireless cable, provide opportunities for advertisers to better target their advertising messages and provide more opportunities for broadcasters to generate more advertising revenues for a number of reasons. With digital television media, the total viewing audience may be divided into many subgroups based on common interests or common demographic descriptors. Advertising targeting is also possible with digital television media due to an expansion in the bandwidth capacity of the broadcast from 8-100 channels in typical analog television, to 200 or more channels in digital. In addition, targeting of the advertisement is further enabled by the capability of a digital set-top box to serve as a storage medium wherein the storage medium may be used to store advertisements to be displayed to the user.

There is a need for a method, apparatus and system to utilize the additional bandwidth and the storage capability of the STB to better target ads to groups, families and/or individual subscribers. Moreover, there is a need for individual household data about viewing preferences and the like to be captured, stored, uploaded to the broadcaster and used to further improve the targeting of the advertising messages.

SUMMARY OF THE INVENTION

This invention is targeted at providing a system and method for distributing advertisements (ads) in a television network, e.g., a cable-based network or a satellite network. In particular, the invention is directed at providing refreshed advertisements to a set-top box (STB), wherein the STB has a memory and stores the refreshed advertisements preferably in a queue, the queue describing the order in which the advertisements should be inserted. A system and method of this invention provides a "client" application that resides on the subscriber equipment, e.g., a set-top box. The inventive system also includes an advertisement management system (AMS) that provides one or more ads to the "client" application. These advertisements may be network-based advertisements, i.e., the same advertisements may be transmitted to all the subscribers, or may be targeted to each individual subscriber, based on subscriber characterizations. In one embodiment, the AMS is directly connected to a subscriber characterization system (SCS) responsible for providing suitable subscriber characteristics.

The client application periodically accesses the AMS to download the ads. The client application generally comprises a memory buffer where one or more ads (e.g., a queue of ads) are stored. Whenever the available ads in the queue have reached a predetermined value, the client application automatically accesses the AMS to download new ads. This predetermined value acts as a trigger for the client application to request more targeted ads. Preferably, the actual download of ads occurs when a subscriber display, such as a television, is off.

In a further embodiment, the client application may accumulate statistics on which ads have been displayed and, for each ad, the number of times (and/or how long) it has been played. The client application may also receive specific instructions from the AMS with reference to the schedule and the frequency of the ads to be displayed to the subscriber.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

Figure 1:
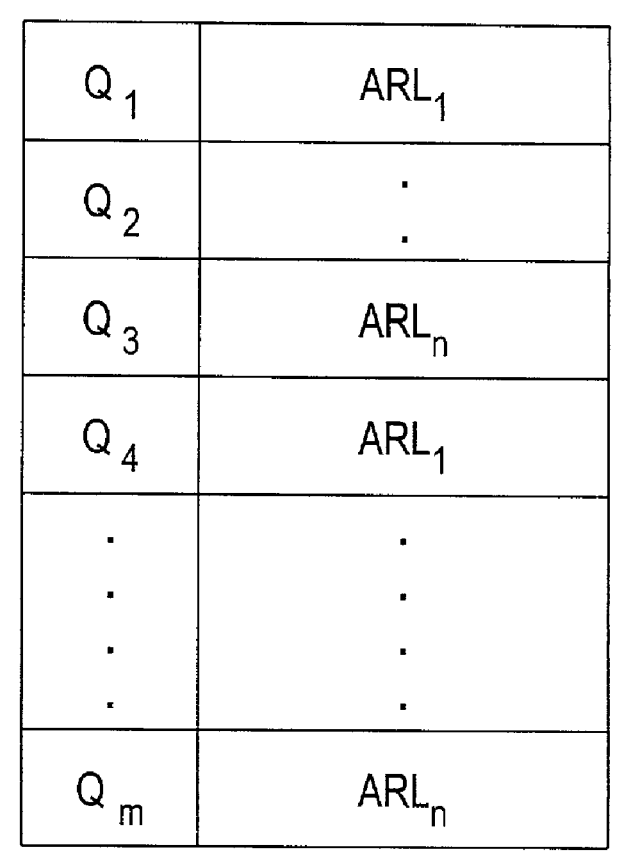

FIG. 1 illustrates an exemplary representation of an advertisement queue;

FIGS. 6A-6C illustrate how an ad channel could be transported to the STB according to different broadband service and delivery platform;

FIG. 7 illustrates a plurality of mechanisms to arrange advertisements in the queue;

FIG. 8 illustrates an exemplary case of a series of advertisements being displayed in a queue;

FIG. 9 illustrates an exemplary case of a series of advertisements being displayed in a queue that are closely spaced with a closer subsequent repetition rate;

DETAILED DESCRIPTION OF THE PREFERRED EMBODIMENT

Figure 2:
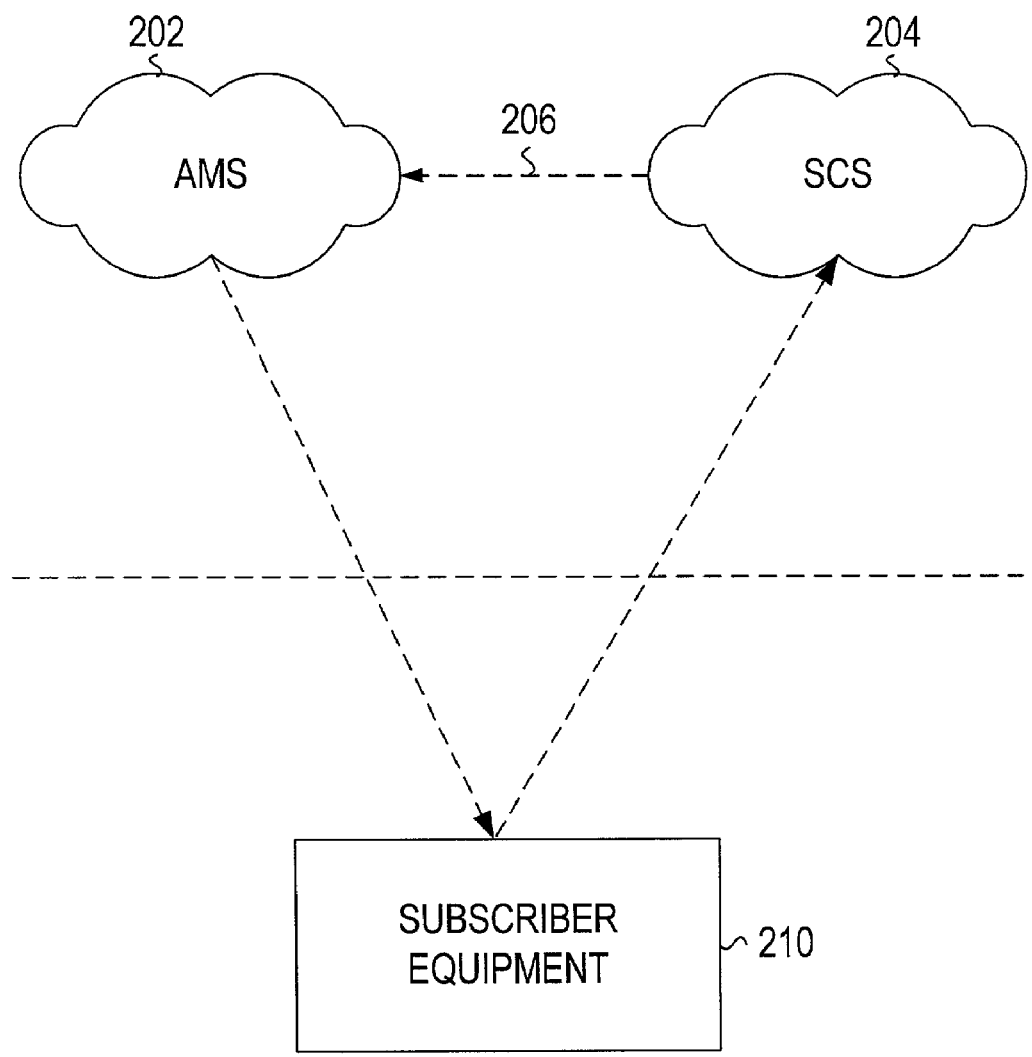
FIG. 2 illustrates an exemplary system diagram for the present invention.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 11 in particular, the method and system of the present invention is disclosed.

In advanced television systems, such as digital cable and Digital Subscriber Line (DSL) systems, advertisements (ads) no longer need to be received from broadcasters, instead the ads may be stored locally at subscriber equipment. For example, a plurality of ads may be stored in memory in the subscriber equipment. The location of each ad is identified by a pointer, known as an ad resource locator (ARL). For example, if n ads are stored in memory, they may be identified as $ARL_1$-$ARL_n$ accordingly, where n is an integer. The subscriber equipment may be a television set-top box (STB) or a personal computer (PC).

A queue identifying the order in which the ads should be played may also be stored in memory. During appropriate opportunities, ads stored in memory may be inserted in the television programs being watched by the subscriber according to the queue. FIG. 1 illustrates an exemplary ad queue. The queue consists of m slots ($Q_1$-$Q_m$) with each slot containing an ad identified by its corresponding ARL. As illustrated, the queue consists of playing each of n ads ($ARL_1$-$ARL_n$) two times.

FIG. 2 illustrates an exemplary system diagram for the present invention. The system 200 comprises an ad management system (AMS) 202 directly communicating to a subscriber characterization system (SCS) 204. The AMS 202 is also configured to communicate to subscriber equipment 210 located at the subscriber end. The subscriber equipment 210 may be a television STB.

Information is exchanged between the AMS 202 and the SCS 204 over communications link 206. The SCS 204 is responsible for characterizing subscribers watching television programming. The SCS 204 monitors subscribers' detailed selection choices including the time, duration of their viewing, the volume at which the programming is listened, the program selection, and collects text information about the programming to determine the type of ads in which the subscriber is most interested. In addition, the SCS 204 may generate a demographic description of the subscriber or household including probable age, income, gender and other demographics. The subscriber characterization process is described in Applicant's co-pending U.S. application Ser. No. 09/204,888 filed on Dec. 3, 1998 entitled "Subscriber Characterization System".

The AMS 202 receives subscriber characterization information from the SCS 204 and based on this information, determines the type of ad in which the subscriber may be interested (i.e., targeted ads suitable for the subscriber). The AMS 202 stores and manages an ad database, the ad database comprising a plurality of ads.

It is to be noted that in the embodiment of FIG. 2, the SCS 204 is utilized to select target advertisements for one or more subscribers. However, in alternative embodiments, the advertisements may not be targeted and a same set of advertisements may be transmitted to each subscriber.

Figure 3:
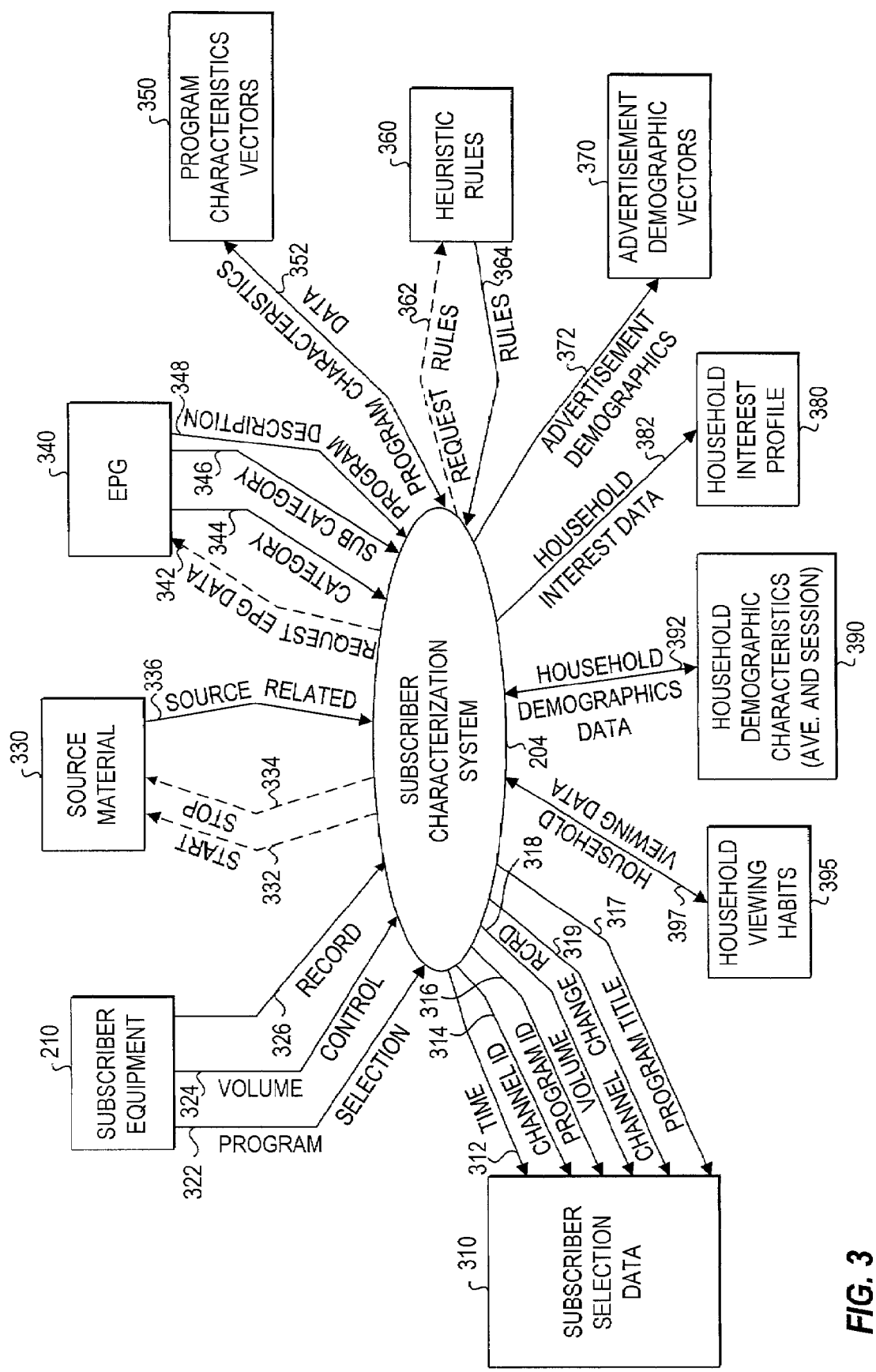
FIG. 3 depicts the context diagram of a preferred embodiment of a Subscriber Characterization System.

FIG. 3 depicts a context diagram of a preferred embodiment of the SCS 204. A context diagram, in combination with entity-relationship diagrams, provide a basis from which one of ordinary skill in the art can realize the present invention. The present invention can be realized in a number of programming languages including C, C++, Perl, and Java, although the scope of the invention is not limited by the choice of a particular programming language or tool. Object oriented languages have several advantages in terms of construction of the software used to realize the present invention, although the present invention can be realized in procedural or other types of programming languages known to those of ordinary skill in the art.

In generating a subscriber profile, the SCS 204 receives input from commands issued in the subscriber equipment 210 in the form of volume control signals 324 or program selection data 322, which can be in the form of a channel change but may also be an address request which requests the delivery of programming from a network address. A record signal 326 indicates that the programming or the address of the programming is being recorded by the user. The record signal 326 can also be a printing command, a tape recording command, a bookmark command or any other command intended to store the program being viewed or the program address for later use.

The material viewed by the subscriber is referred to as source material 330. The source material 330, as defined herein, is the content that a subscriber selects and may consist of analog video, Motion Picture Expert Group (MPEG) digital video source material, other digital or analog material, Hypertext Markup Language (HTML) or other type of multimedia source material. The SCS 204 can access the source material 330 received by the subscriber using a start signal 332 and a stop signal 334, which controls the transfer of source related text 336 which can be analyzed as described herein.

In a preferred embodiment, the source related text 336 can be extracted from the source material 330 and stored in memory. The source related text 336, as defined herein, includes source related textual information including descriptive fields, which are related to the source material 330, or text, which is part of the source material 330 itself. The source related text 336 can be derived from a number of sources including but not limited to closed captioning information, Electronic Program Guide (EPG) material, and text information in the source itself (e.g., text in HTML files).

The EPG 340 contains information related to the source material 330 that is useful to the subscriber. The EPG 340 is typically a navigational tool that contains source related information including but not limited to the programming category, program description, rating, actors, and duration. The structure and content of EPG data is described in detail in U.S. Pat. No. 5,596,373 assigned to Sony Corporation and Sony Electronics, which is herein incorporated by reference. As shown in FIG. 3, the EPG 340 can be accessed by the SCS 204 by a request EPG data signal 342 that results in the return of a category 344, a sub-category 346, and a program description 348.

In one embodiment of the present invention, the EPG data is accessed and program information, such as the category 344, the sub-category 346, and the program description 348 are stored in memory.

In another embodiment of the present invention, the source related text 336 is closed captioning text embedded in the analog or digital video signal. Such closed captioning text can be stored in memory for processing to extract program characteristics vectors 350.

One of the functions of the SCS 204 is to generate the program characteristics vectors 350 which are comprised of program characteristics data 352, as illustrated in FIG. 3. The program characteristics data 352, which can be used to create the program characteristics vectors 350 both in vector and table form, are examples of source related information 336 which represent characteristics of the source material 330. In a preferred embodiment, the program characteristics vectors 350 are lists of values that characterize the programming (source) material according to the category 344, the sub-category 346, and the program description 348. The present invention may also be applied to ads, in which case, the program characteristics vectors 350 contain, as an example, a product category, a product sub-category, and a brand name.

As illustrated in FIG. 3, the SCS 204 uses heuristic rules 360. The heuristic rules 360, as described herein, are composed of both logical heuristic rules as well as heuristic rules expressed in terms of conditional probabilities. The heuristic rules 360 can be accessed by the SCS 204 via a request rules signal 362, which results in the transfer of a copy of rules 364 to the SCS 204.

The SCS 204 forms ad demographic vectors 370 from ad demographics 372, as illustrated in FIG. 3. The ad demographic vectors 370 represent characteristics in the form of the intended or expected demographics of the audience for which the ads should be intended.

Subscriber selection data 310 is obtained from the monitored activities of the user and in a preferred embodiment can be stored in a dedicated memory. In an alternate embodiment, the subscriber selection data 310 is stored in a storage disk. Information which is utilized to form the subscriber selection data 310 includes time 312, which corresponds to the time of an event, channel ID 314, program ID 316, volume level 318, channel change record 319, and program title 317.

In a preferred embodiment, a household viewing habits 395 as illustrated in FIG. 3, is computed from the subscriber selection data 310. The SCS 204 transfers household viewing data 397 to form household viewing habits 395. The household viewing data 397 is derived from the subscriber selection data 310 by looking at viewing habits at a particular time of day over an extended period of time, usually several days or weeks, and making some generalizations regarding the viewing habits during that time period.

One output of the SCS 204 is a household profile including household demographic characteristics 390 and a household interest profile 380. The household demographic characteristics 390 resulting from the transfer of household demographic data 392, and the household interest profile 380, resulting from the transfer of household interests data 382. Both the household demographics characteristics 390 and the household interest profile 380 have a session value and an average value.

The AMS 202 receives ad demographic vectors 370 and other information from the SCS 204 and based on that information, selects the targeted ads to be transmitted to the subscriber equipment 210. The subscriber equipment 210 comprises a client application that periodically accesses the AMS 202 and downloads the specifically targeted ad.

At the subscriber equipment 210, the downloaded ads are stored in a queue, wherein the queue represents an ordered list used to arrange the ads. In a preferred embodiment, the client application, based on the instructions received from the AMS 202, inserts the ads from the queue in one or more program streams. It is to be noted that the principles of the present invention rely on program independent advertising, i.e., the ads from the queue may be displayed to the subscriber at any time the subscriber is watching television, irrespective of the programs being watched.

It is to be noted that in the above-described embodiment as it relates to FIG. 2 and FIG. 3, the present invention utilizes targeted advertising, wherein advertisements are matched to groups of subscribers (e.g., nodes in a cable television environment or to individual subscribers in switched digital video or streaming video environments.) The actual formation of groups for targeted advertising may also be accomplished by creating multiple lists or tables (subgroups) of subscribers that share one or more subscriber characteristics. The subgroups may be based on (1) geographic segmentation, (2) demographic segmentation, (3) psychological segmentation, (4) psychographic segmentation, (5) sociocultural segmentation, (6) use-related segmentation, (7) use-situation segmentation, (8) benefit segmentation, and (9) hybrid segmentation. More information may be found in a book entitled *Consumer Behavior*, by Leon G. Schiffman and Leslie Lazar Kanuk published by Prentice Hall, New Jersey 1999.

The analysis of different segmentations permit the advertisement to be directed to specific subscribers or groups of subscribers who fit certain criteria. For instance, an advertisement for a baby stroller could reach parents of children under five years old—and only those individuals in that group. The other publicly or privately available data regarding the subscribers may also be collected. This data may also be mined to form a subgroup of subscribers which has a common characteristic which matches the characteristics of the target group.

One technique for forming groups involves the utilization of geographic location information. Each group may consist of subscribers located in a particular state, city, or associated with a cable television node. Another technique for forming groups is based on knowledge of the viewership of the actual programming. For example, many companies collect data related to the viewing of the television programming and such information may be used to form subgroups. Once such collection of data, known as the Nielsen ratings, are based on samples of information related to the viewing of television programming. Other types of similar information are also available. The groups may be based on the actual viewership information, on an estimate of the current viewership, or on the statistical measurement of the viewership.

It is to be noted that the advertisements delivered to one or more STBs need not be targeted advertisements. Instead, the network-based advertisements, e.g., national advertisements, may be transmitted to one or more subscribers.

The client application also collects advertising related statistics. Generally, this is accomplished with a counter in the subscriber equipment 210. The counter counts all the ads displayed to the subscriber.

Figure 4:
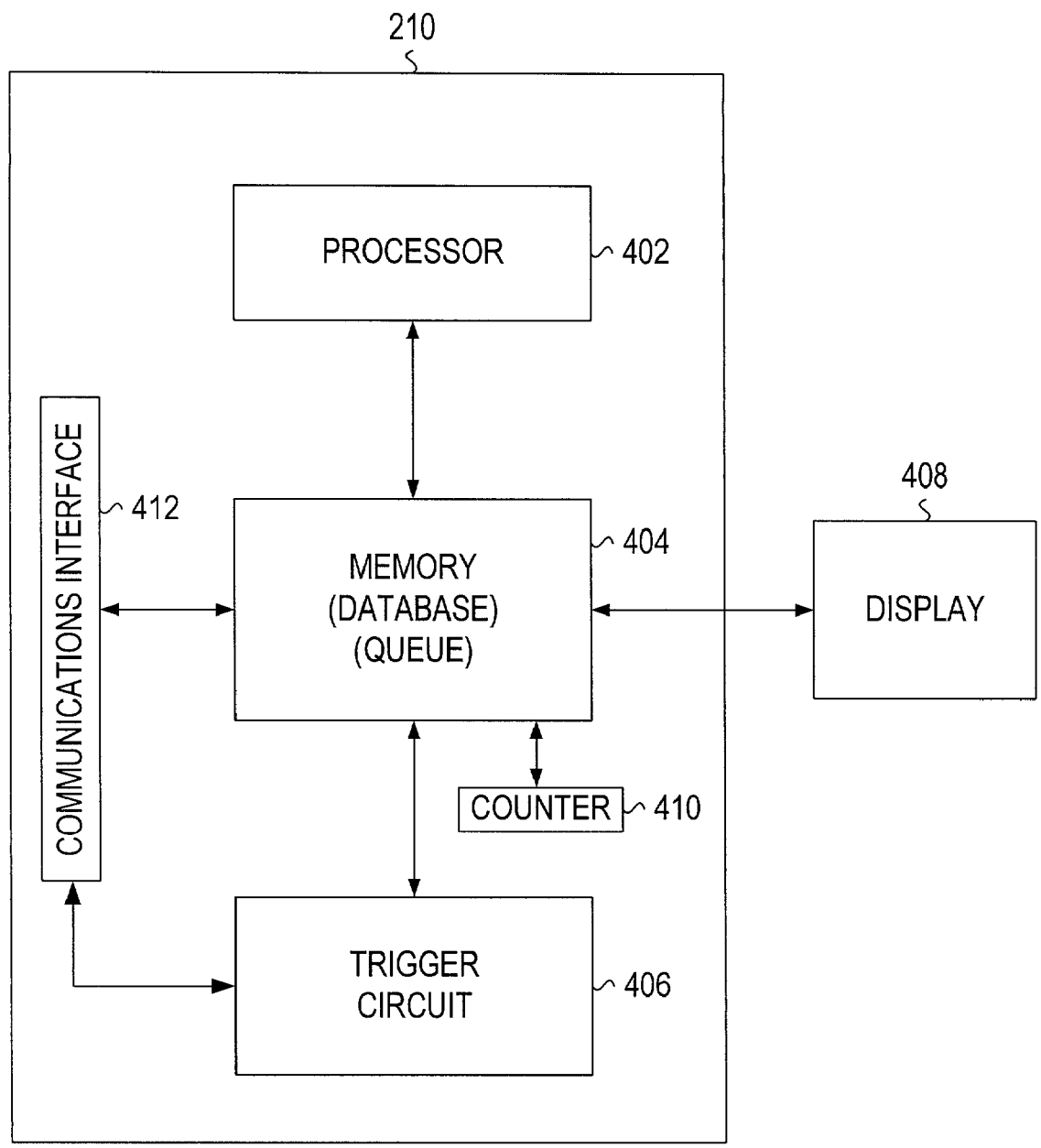
FIG. 4 illustrates exemplary subscriber equipment configured in accordance with the principles of the present invention.

FIG. 4 illustrates exemplary subscriber equipment 210 configured in accordance with the principles of the present invention. The subscriber equipment 210 comprises a processor 402 and a memory 404 (configured to store an ad database and a queue of the ads). The memory 404 is coupled to a trigger circuit 406, wherein the trigger circuit 406 is configured to initiate a request for new targeted ads and/or a new ad queue. The memory 404 is also coupled to a counter 410 configured to record each display of the ad to the subscriber. The memory 404 is also connected to a display medium 408, such as a television. The display medium 408 displays the ads to the subscriber. The ads to be displayed to the subscriber are stored in the memory 404, either as a database or a queue. The subscriber equipment 210 also comprises a communications interface 412 that can be used to receive one or more ads to be stored in the memory 404.

The advertisements may be delivered to the set-top box in a low bandwidth channel or in a high-speed channel. These channels could be dedicated to ad delivery or could-be shared, providing delivery channels for other services. The low bandwidth method of delivery would require that the ads be delivered (or begin being delivered) significantly in advance of the ad presentation. Ads delivered via a high bandwidth channel could be delivered at or just prior to the time of presentation.

An example of such a dedicated channel may a broadcast high bandwidth ad channel. A service provider (i.e., Digital Broadcast Satellite (DBS), cable, Switched Digital Video (SDV), Multichannel Multipoint Distribution System (MMDS), Local Multipoint Distribution System (LMDS), allocates and dedicates one or more "channels" of the system to be used for delivering advertisements. This channel, used for transporting ads, would be a high bandwidth (e.g., 6 MHz) channel, and would, in one embodiment, carry nothing but ads. In one embodiment, the operator would determine which ads were sent, but essentially ads would be continually sent to the STB, the STB being able to store, for subsequent display. The appropriate ads carried on this channel would be encoded and transported in the same way that the other programming content (on other channels) was encoded and transported. That is, if one were to "tune" to the ad channel, one would receive only conventional advertisements (normal video and audio).

In the case of analog video, the ads would be transmitted just as analog video is transmitted over the network. In the case of digital video, the ad would be encoded and transported in the same way as conventional programming. A 6 MHz channel could carry several digital ad channels just as several digital video channels are carried within one 6 MHz channel. Moreover, other services (e.g., data) could be carried in the ad channel with the ads if desired.

Figure 5:
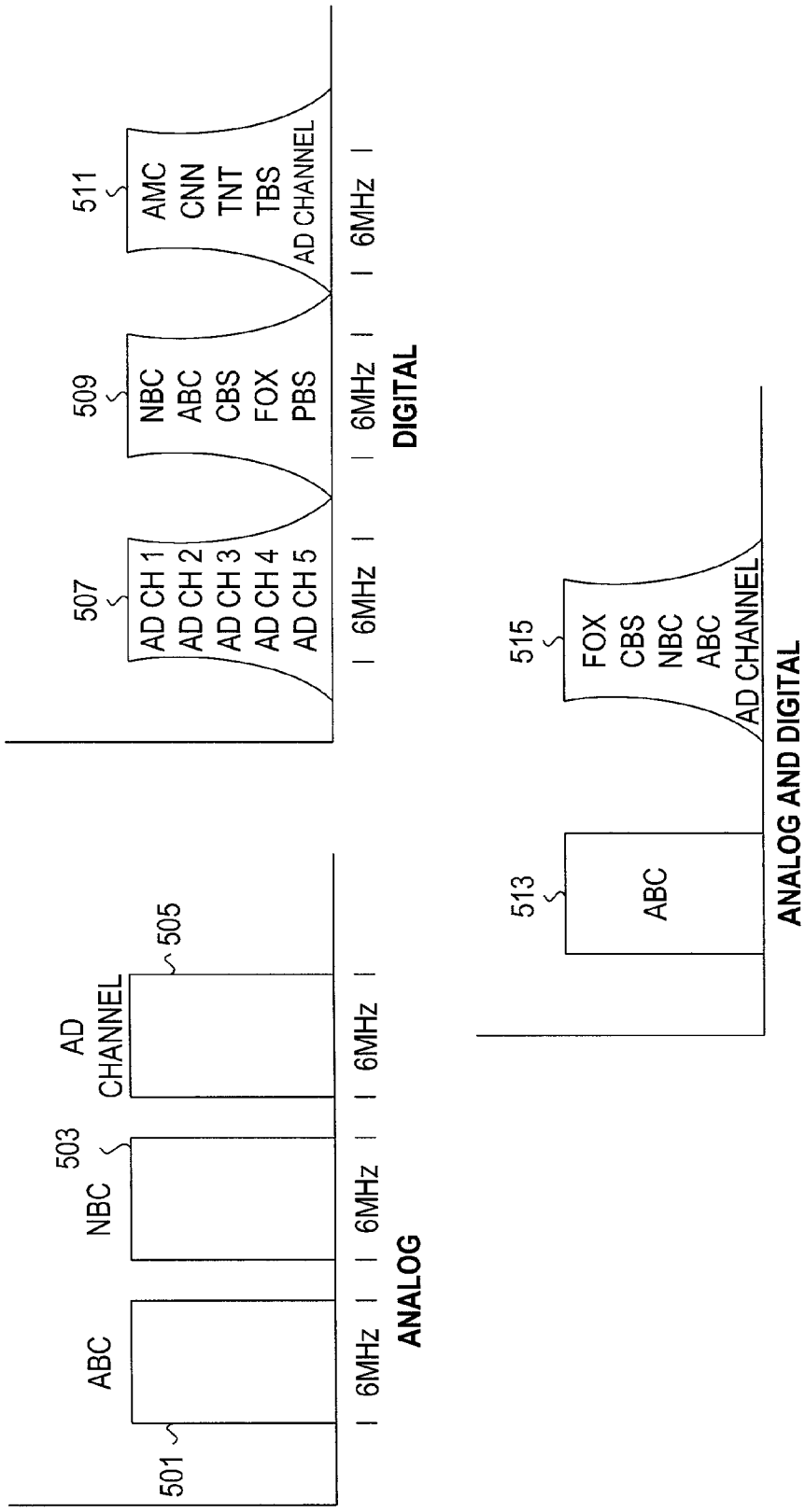
FIG. 5 illustrates how advertisements may be transmitted on an ad channel.

FIG. 5 shows several ways how a high bandwidth ad channel could be transmitted, digitally or in analog form. As shown in FIG. 5, a conventional analog dedicated 6 MHz channel 505 may be used to carry advertisements. Generally, the ad channel in this instance is a 6 MHz digital channel transmitted along with the programming, e.g., ABC (501), NBC (503).

One or more ad channels may be carried within a 6 MHz digital channel. FIG. 5 shows a contiguous sequence of five advertisement channels within a dedicated digital ad channel 507. The digital ad channel 507 may be transmitted along with a digital programming channel 509. Furthermore, multiple digital ad channels may be carried within one 6 MHz digital channel and carried along with the programming (511).

Alternatively, a mixture of analog and digital may be chosen, e.g., an analog channel may be used to carry programming 513, and digital channel 515 wherein the digital channel 515 carries the programming as well as the ad channel.

Ads can also be delivered to the STB via low and medium bandwidth channels as well and in a variety of formats (e.g., streaming media, MPEG-2, etc.) and protocols (Asynchronous Transfer Mode (ATM), Internet Protocol (IP), etc.) as will be evident to those skilled in the art.

FIGS. 6A-6C illustrate ad channels being sent on low-moderate bandwidth channels, both at constant bit rates and variable bit rates. An example as shown in FIG. 6A, of such low bandwidth channels would be a dedicated channel 601 in which the advertisements are continually sent but at a low bit rate, and ultimately stored as a complete advertisement file on the STB. In FIG. 6A, the time is shown at the X axis, and the bit rate is shown on the Y axis.

Another approach is the "trickle down" approach that allows ad delivery to the STB without requiring a dedicated high bandwidth ad channel, such a high bandwidth channel being available for other services (e.g., network programming).

In this scenario, network bandwidth demand (or bandwidth demand by one or more individual subscribers) is monitored in real-time or statistically predicted. As shown in FIG. 6B, the ad channel is delivered at a varying bit rate following the bandwidth demands of the system. For example, as bandwidth demanded by the system channel increases, the bandwidth allocated for transmitting the ad channel would proportionally reduce. Similarly, when the bandwidth demand for the system channel decreases, the available bandwidth for carrying the ad channel is increased. FIG. 6B illustrates a varying bandwidth ad channel 603 which is shown to fluctuate. Generally, ad channel 603 varies based on the bandwidth used by the system channel 605. If the system channel (carrying programming and default advertisements) consumes more bandwidth, the bandwidth available to the ad channel is reduced. The sum of the ad channel bandwidth and the system channel bandwidth cannot exceed the maximum available. Such variable bit rate transmission schemes are well known to those skilled in the art.

Alternatively, advertisements could be delivered at "off-peak" times (i.e., when the overall demand for bandwidth is comparatively low). Bandwidth usage can be monitored and statistically predicted, either for the entire network, a sub-portion of the network, or an individual subscriber. By anticipating or predicting a period of decreased bandwidth demand (either network-wide or individually), the advertisement delivery would coincide with such decreased demand. Such a scenario would allow operators to conserve bandwidth during "peak" times for other services. In off-peak download, the ad channel can operate at comparatively high bandwidth. FIG. 6C illustrates an off-peak download ad channel 607. It is to be noted that the off-peak download ad channel can be a medium to high bandwidth channel.

The methods described above for delivery of the ad channel are applicable to a variety of platforms including, but not limited to, DBS, SDV, analog hybrid fiber coax (HFC), digital HFC, MMDS and LMDS.

At the subscriber end, to increase the effectiveness of the ad, a plurality of mechanisms may be used to arrange ads in the queue stored in the memory 404 of the STB. For example, repetition may be used, where the ad is displayed at predetermined intervals. For exemplary purposes, as shown in FIG. 7, a Ford ad (located at $ARL_1$) may be shown as the fifth ad repeatedly. The ARL for Ford would be placed in the queue periodically such that $Q_{new}=Q_{old+5}$. As illustrated in FIG. 7, the Ford ad is queued at slots $Q_1$, $Q_6$ and $Q_{11}$.

It should be noted that it is not necessary that every Ford ad be the same and, in fact, ads may be variants of an ad (such as a sequel or series of ads) so that the subscriber does not get bored by a particular ad. FIG. 8 illustrates such an exemplary case, wherein different Ford ads identified as $ARL_1$, $ARL_6$, and $ARL_{11}$ are queued in slots $Q_1$, $Q_6$ and $Q_{11}$, respectively.

Furthermore, the ads in the queue may not be spaced evenly. For example, the spacing between ads may decrease with time (i.e., the repetition rate increases). An exemplary case is illustrated in FIG. 9, where the Ford ad (located at $ARL_1$) is placed in the queue at slots $Q_1$, $Q_8$ and $Q_{14}$. Thus, the initial spacing is 6, with other ads between each Ford ad (i.e., a repetition rate of 1 Ford ad every 7 ads) and decreases to 5 other ads between each Ford ad (i.e., a repetition rate of 1 Ford ad every 6 ads).

Alternatively, the ads may be stored in the queue based on time-based priority queuing. In this arrangement, the ads are arranged according to desired times for display. Other parameters may include the maximum number of ads played, the hours of the day during which the ad should be displayed, the days of the week during which the ad should be displayed, the weeks in the month during which the ad should be displayed, etc.

Along with actual ads and address locators for the ad, ancillary data for each ad is also stored. In typical cases, the following data for each ad is gathered and stored:

Ad Identification: a unique identifier for each ad;

Ad Play Times Maximum Number: the maximum number of times each ad should be displayed;

Ad Expiration Date: a date beyond which the ad should no longer be displayed;

Ad Player Identification: a unique identifier of the type of client application software that must be used to display the ad;

Ad Hour Frames: the hours of the day during which the ad should be displayed;

Ad Day Frames: the days of the week during which the ad should be displayed;

Ad Week Frames: the weeks in the month during which the ad should be displayed;

Ad Month Frames: the months in the year during which the ad should be displayed;

Ad Frequency: the maximum number of times the ad should be displayed in one day;

Daily Ad Playing Counter: the number of times the ad has been displayed on a given day;

Last Playing Day: the date after which the ad cannot be displayed; and

Total Ad Playing Number: the total number of times an ad has been displayed.

In a preferred embodiment, the processor 402 monitors the subscriber activity, for example, when the subscriber is most likely to be watching the display 408. The processor then determines the next ad to be displayed to the subscriber based on the ad queue. The actual insertion of the ad in the program stream may be accomplished in any one of the known means.

Figure 10:
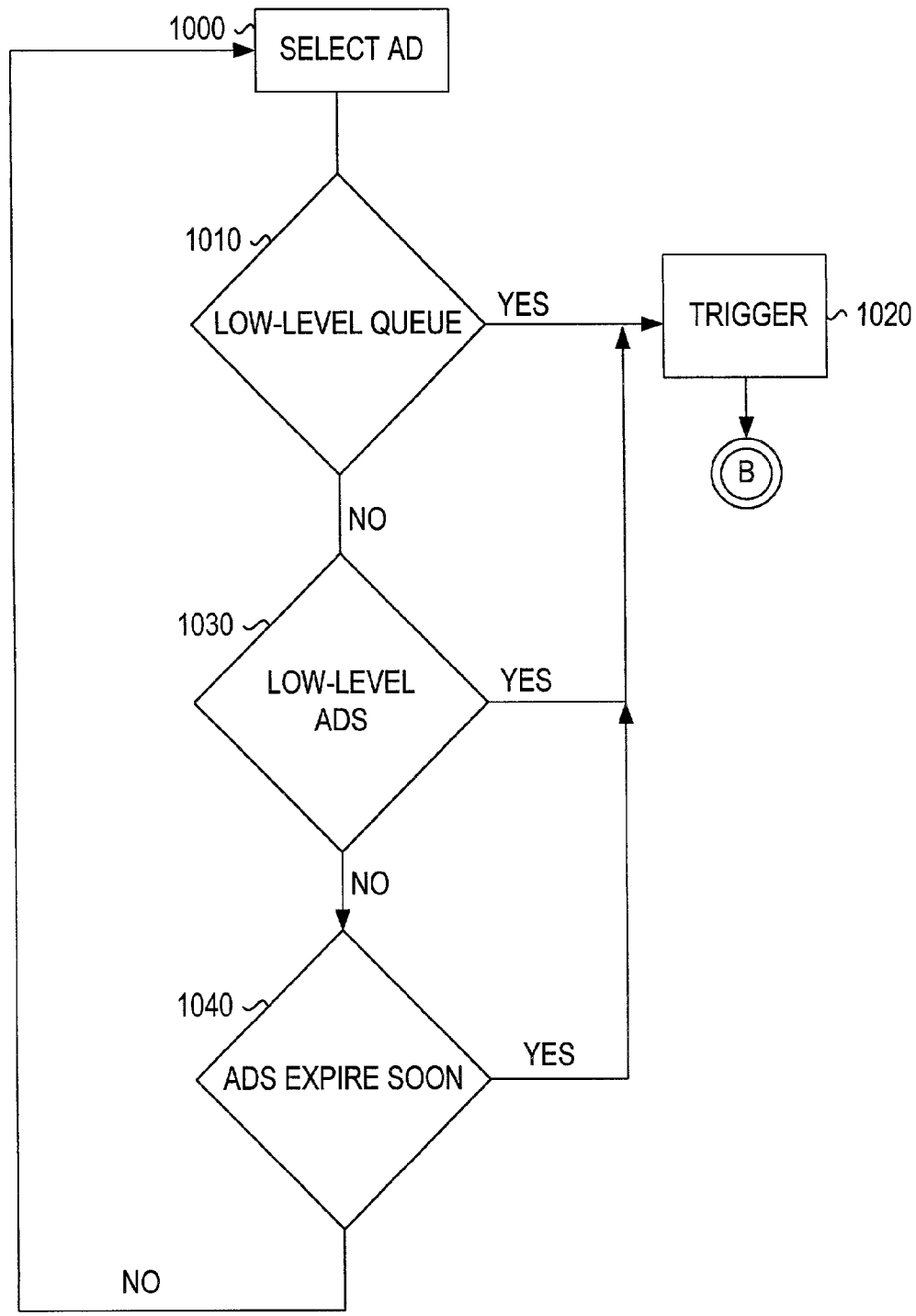
FIG. 10 shows a preferred control routine used by the processor of the subscriber equipment.

FIG. 10 illustrates a preferred control routine used by the processor 402 of the subscriber equipment 210. Initially an ad is selected from the queue and displayed to the subscriber (step 1000). After the ad is selected from the queue, the routine determines if the ad queue has reached a low level (step 1010). The low level may be, for example, a predefined or variable number of slots, or a number of slots equal to a predetermined or variable amount of time (ads associated with these queues adding up to a total of 10 minutes of ads).

To illustrate the concept, assume that initially the memory in the subscriber equipment 210 was loaded with 10 ads and the queue consists of 50 slots, representing an order for displaying the 10 ads. Moreover, assume that the ads associated with the first 40 slots were displayed so that the queue would only consist of 10 slots. If we assume, that the low-level trigger is pre-defined as 9 slots remaining, then when the ad associated with the $41^{st}$ slot was displayed the queue would be reduced to the low-level.

If the determination is that the queue has reached the low-level then the trigger circuit will be initiated (step 1020). The processing associated with the trigger circuit is explained with reference to FIG. 11.

If the determination is that the queue has not reached the low-level then a determination needs to be made if the number of ads remaining in the queue has reached a low-level (step 1030). The ad low-level may be a pre-defined number, for example, 3 ads remaining in the queue. This would signify that every time an ad avail was presented, the system would only have one of three targeted ads that it could possibly substitute. Such a scenario would likely result in the same ad being displayed to the subscriber in a relatively short period.

As one of ordinary skill in the art would recognize, the situation where there are very few ads remaining in the queue may occur for many reasons. For example, as described above, the "Ad Play Times Maximum Number", associated with each ad defines the maximum number of times the ad should be displayed. When an ad has been displayed the maximum number of times, the ad is marked unavailable and will no longer be displayed (i.e., is effectively removed from the queue). As an additional example, an ad may be removed from the queue before it has been played the number of times defined in the queue (or even before it has ever been displayed) if the "Ad Expiration Date" has passed.

If the ads remaining in the queue reaches the low-level then the trigger circuit will be initiated (step 1020). Otherwise, a determination will be made as to whether all or a certain amount of the ads in the queue will expire within a relatively short time (step 1040). The amount of expired ads may be a pre-defined or variable number or percentage and the short time may be a predefined or variable window of time that could be a number of minutes, hours, days, etc.

If the criteria defined in step 1040 are met (i.e., most or all of the ads will expire within the defined window of time), the trigger circuit is initiated (step 1020). Otherwise, the process returns to step 1000.

As one of ordinary skill in the art would recognize, the steps of the routine described above with respect to FIG. 10 could be rearranged, additional steps could be added, steps could be removed, or completely different steps could be used to accomplish the same function, without departing from the scope of the current invention.

Figure 11:
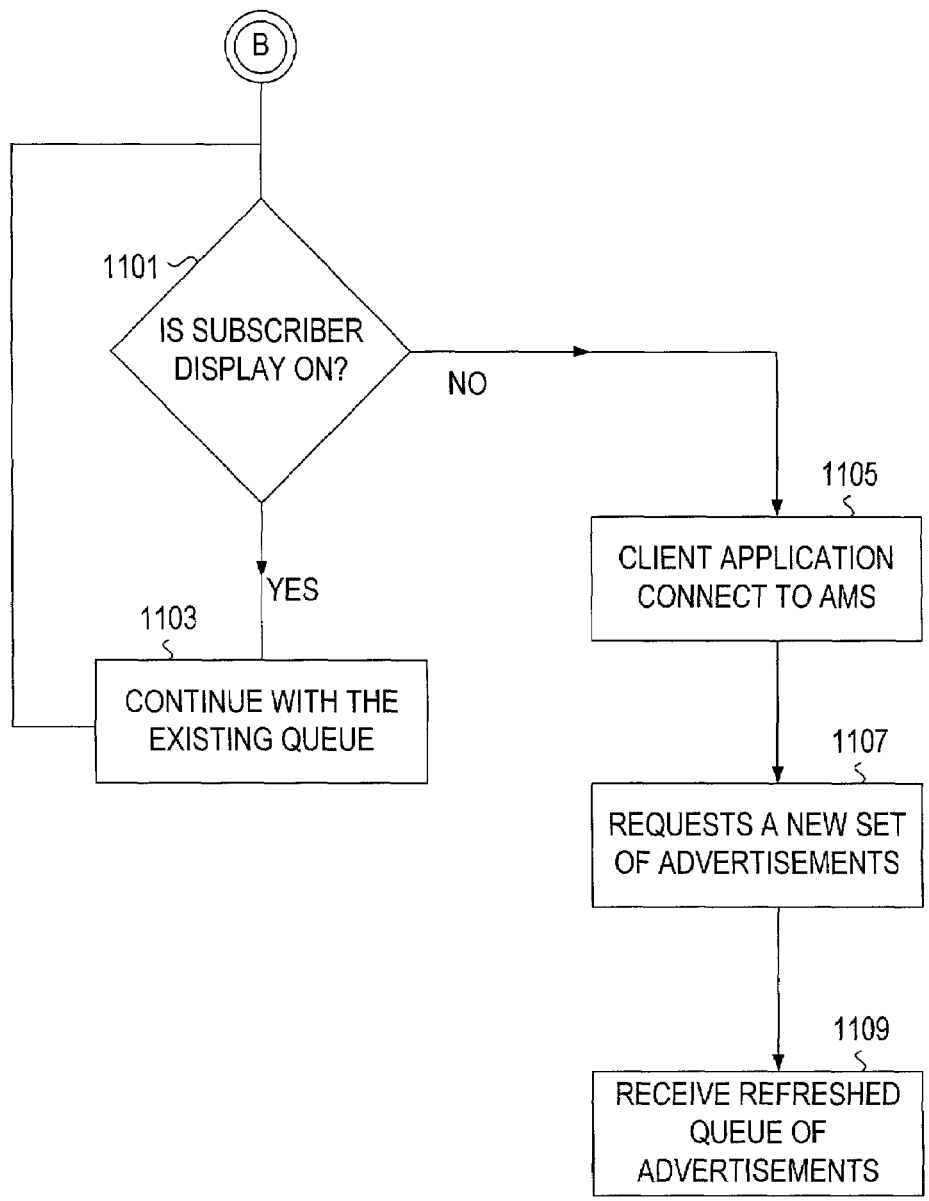
FIG. 11 illustrates the processing involved when the trigger circuit has been initiated.

FIG. 11 illustrates the preferred processing involved when the low-level trigger circuit has been initiated. Initially a determination is made as to whether the subscriber display 408 is ON (step 1101). If the display 408 is on, the existing queue is used (step 1103) and the process returns to step 1101. Alternatively, if a determination is made that the subscriber display 408 is OFF, the client application connects to the AMS 202 (step 1105). The client application requests a new set of ads (step 1107) and then receives a new set of ads and the queue is either refreshed or a new queue is also received (step 1109).

In alternative embodiments, step 1101 is not required and the ads and queue can be refreshed even if the TV is on. The methods for receiving ads at the STB was described with reference too FIGS. 5 and 6.

For example, the new ads and queue may be downloaded at a time when the television network will have sufficient bandwidth, such as 2 AM. In this embodiment, if the queue was completely emptied prior to the predefined time for refreshing the queue, the system could just display the default commercials to the subscriber until the queue was refreshed. Alternatively, the new ads could be downloaded to the memory 404 at a rate that could be supported by the television network taking into account the programming that was being viewed. That is, when programming utilizing a large amount of bandwidth was required the ads would either not be downloaded or would be downloaded at a low rate. When the programming being displayed was low bandwidth the ads could be downloaded at a greater rate.

As one of ordinary skill in the art would recognize, there are numerous methods for downloading new ads and a new queue to the memory 404 that would be well within the scope of the current invention.

Although this invention has been illustrated by reference to specific embodiments, it will be apparent to those of ordinary skill in the art that various changes and modifications may be made that clearly fall within the scope of the invention. The invention is intended to be protected broadly within the spirit and scope of the appended claims.

What is claimed:

1. In a television network system, subscriber equipment for displaying targeted advertisements to a subscriber, the subscriber equipment comprising:
    a communications interface for receiving at least one queue identifying a sequence of targeted advertisements, wherein the at least one queue is selectively distributed to the subscriber and the targeted advertisements have been previously matched to the subscriber, and wherein at least one of the targeted advertisements is repeatedly placed in the queue according to a controllable predetermined spacing, the controllable predetermined spacing specifying the number of intervening advertisements between occurrences of the at least one targeted advertisement and wherein the controllable spacing predetermined is specified by an advertiser;
    memory for storing the at least one queue;
    a processor, responsive to the at least one queue, configured to repeatedly insert the targeted advertisements into program streams for display to the subscriber in accordance with the sequence; and
    a trigger circuit for determining if the at least one queue has reached a low-level, wherein said communications interface refreshes the at least one queue in response to a low-level determination by said trigger circuit.

2. The system of claim 1, further comprising a counter for tracking the number of times each targeted advertisement is displayed to the subscriber.

3. The system of claim 1, wherein said communications interface also receives the targeted advertisements and said memory also stores said targeted advertisements.

4. The system of claim 3, wherein each targeted advertisement stored in said memory is identified by an advertisement identifier that uniquely identifies the targeted advertisement and the at least one queue references the advertisement identifier.

5. The system of claim 1, wherein for each targeted advertisement, the at least one queue includes advertiser data identifying the advertiser sponsoring the advertisement.

6. The system of claim 1, wherein for each targeted advertisement, the at least one queue includes a time frame defining a time during which the targeted advertisement should be displayed.

7. The system of claim 6, wherein the time frame defining the time during which the advertisement should be displayed includes at least one of:
    an hour frame indicating the hours of the day during which the advertisement should be displayed;
    a day frame indicating the days of the week, month or year during which the advertisement should be displayed;
    a week frame indicating the weeks of the month or year during which the advertisement should be displayed; and
    a month frame indicating the months of the year during which the advertisement should be displayed.

8. The system of claim 1, wherein for each targeted advertisement, the at least one queue includes at least one of:
    an expiration date of the targeted advertisement;
    a maximum total number of times the targeted advertisement should be displayed;
    a maximum number of times the targeted advertisement should be displayed each day;
    a total number of times the targeted advertisement has previously been displayed to the subscriber; and
    a number of times the targeted advertisement has been displayed that day.

9. The system of claim 1, wherein said trigger circuit determines that the at least one queue has reached a low-level if at least one of the following occur:
    the at least one queue has less than a particular number of slots remaining;
    the at least one queue has less than a particular number of targeted advertisements remaining; and
    the at least one queue has a particular number of targeted advertisements that are within a specified time of being expired.

10. The system of claim 1, wherein said communications interface is connectable to an advertisement management system over a network connection wherein the targeted advertisements are identified by the advertisement management system based on a profile of the subscriber supplied to the advertisement management system.

11. The system of claim 1, wherein the at least one queue includes a state indicator for activating said trigger circuit.

12. The system of claim 1, wherein the controllable predetermined spacing is variable.

13. A method of displaying targeted advertisements to a subscriber in a communications network, the method comprising:

(a) selectively distributing at least one queue to a node associated with the subscriber, each queue identifying an ordered list of targeted advertisements, each of the targeted advertisements being previously matched to the subscriber, and wherein a sequence including at least two of the targeted advertisements is placed in the queue according to a controllable predetermined spacing, wherein the controllable predetermined spacing is specified by an advertiser, the controllable predetermined spacing specifying the number of intervening advertisements between one of the at least two advertisements and the successive advertisement of the at least two advertisements in the sequence;

(b) storing the at least one queue at the node;

(c) inserting the targeted advertisements into one or more programming streams displayed to the subscriber, the advertisements being repeatedly inserted in accordance with the ordered list of the corresponding at least one queue; and (d) refreshing the at least one queue upon a determination that the at least one queue has reached a low-level.

14. The method of claim 13 further comprising:

(e) tracking the number of times each targeted advertisement is displayed to the subscriber.

15. The method of claim 13 wherein each targeted advertisement is identified by an advertisement identifier that uniquely identifies the targeted advertisement and the at least one queue references the advertisement identifier.

16. The method of claim 13 wherein for each targeted advertisement, the at least one queue includes advertiser data identifying the advertiser sponsoring the advertisement.

17. The method of claim 13, wherein for each targeted advertisement, the at least one queue includes a time frame defining a time during which the targeted advertisement should be displayed.

18. The method of claim 17, wherein the time frame defining the time during which the advertisement should be displayed includes at least one of:

an hour frame indicating the hours of the day during which the advertisement should be displayed;

a day frame indicating the days of the week, month or year during which the advertisement should be displayed;

a week frame indicating the weeks of the month or year during which the advertisement should be displayed; and a month frame indicating the months of the year during which the advertisement should be displayed.

19. The method of claim 13, wherein for each targeted advertisement the at least one queue includes at least one of:

an expiration date of the targeted advertisement;

a maximum total number of times the targeted advertisement should be displayed;

a maximum number of times the targeted advertisement should be displayed each day;

a total number of times the targeted advertisement has previously been displayed to the subscriber; and a number of times the targeted advertisement has been displayed that day.

20. The method of claim 13, wherein the determination of step (d) is made if one of the following occur:

the at least one queue has less than a particular number of slots remaining;

the at least one queue has less than a particular number of targeted advertisements remaining; and the at least one queue has a particular number of targeted advertisements that are within a specified time of being expired.

21. The method of claim 13, wherein at least three advertisements of the targeted advertisements are placed in the queue according to the controllable predetermined spacing.

22. The method of claim 21, wherein the controllable predetermined spacing specifies different numbers of intervening advertisements between successive targeted advertisements in the sequence.

23. The method of claim 13, wherein the at least two advertisements are identical.

24. The method of claim 13, wherein the at least two advertisements are sponsored by the same advertiser.

25. The method of claim 13, wherein the at least two advertisements are variants of each other.

26. A method of allowing an advertiser to purchase advertisement opportunities to be displayed to a subscriber in a communications network, the method comprising:

(a) receiving a controllable predetermined spacing according to which the advertiser's advertisements will be displayed, wherein the controllable predetermined spacing is specified by the advertiser;

(b) arranging at least one queue of targeted and ordered advertisements, each of the targeted advertisements being previously matched to the subscriber, and wherein the advertiser's advertisements are inserted in the queue according to the controllable predetermined spacing, the controllable predetermined spacing specifying the number of intervening advertisements between successive occurrences of the advertiser's advertisements;

(c) selectively distributing the at least one queue to a node associated with the subscriber;

(d) storing the at least one queue at the node;

(e) inserting the targeted advertisements into avails in one or more programming streams displayed to the subscriber, the advertisements being repeatedly inserted in accordance with the order of the at least one queue.

27. The method of claim 26, wherein the controllable predetermined spacing is variable.

28. The method of claim 26, wherein the advertiser specifies varying numbers of intervening advertisements for the controllable predetermined spacing.

29. The method of claim 26, wherein the advertiser specifies that the controllable predetermined spacing is a certain number of advertisements for the spacing between the first and second occurrences of the advertiser's advertisements and a different number of advertisements for the spacing of between the second and third occurrences of the advertiser'advertisements.

30. A method of displaying targeted advertisements to a subscriber in a communications network, the method comprising:

(a) receiving a plurality of targeted advertisements at subscriber equipment, wherein each advertisement has been previously matched to the subscriber;

(b) storing the plurality of advertisements at the subscriber equipment;

(c) allowing an advertiser to specify that a subset of the plurality of targeted advertisements is to be displayed to the subscriber according to a controllable predetermined spacing, the controllable predetermined spacing specifying the number of intervening advertisements between the advertisements of the subset and the subsequent advertisement of the subset;

(d) arranging the plurality of targeted advertisements in a queue having a sequence, wherein the subset of the plurality of targeted advertisements is placed in the queue according to the controllable predetermined spacing;

(e) inserting the targeted advertisements into a programming stream for display to the subscriber in accordance with the sequence.

31. The method of claim 30, wherein the controllable predetermined spacing is variable.

32. A method for displaying advertisements to a subscriber in a communications network, the method comprising:

(a) selecting a plurality of target advertisements matched to a subscriber;

(b) arranging at least a subset of the plurality of targeted advertisements in at least one queue, wherein a first targeted advertisement is placed a first predetermined interval from a second targeted advertisement, the first predetermined interval being the number of advertisements separating the first and second targeted advertisements, and wherein the first predetermined interval is specified by an advertiser;

(c) selectively distributing the at least one queue to a node associated with the subscriber;

(d) storing the at least one queue at the node;

(e) inserting the targeted advertisements into avails in one or more programming streams displayed to the subscriber, the advertisements being repeatedly inserted in accordance with the sequence of the at least one queue.

33. The method of claim 32, wherein a third targeted advertisement is placed into the at least one queue at a second predetermined interval from the second targeted advertisement.

34. The method of claim 33, wherein the first predetermined interval and the second predetermined interval specify the same number of intervening advertisements.

35. The method of claim 33, wherein the first predetermined interval and the second predetermined interval specify a different number of intervening advertisements.

36. The method of claim 35, wherein the second predetermined interval is specified by the advertiser.

37. The method of claim 33, wherein the first and second targeted advertisements are variants of each other.

38. The method of claim 32, wherein the first and second targeted advertisements are the same advertisement.

39. The method of claim 32, wherein the first and second targeted advertisements are for the same advertiser.

* * * * *